A. J. FARRAND & A. QUICK.
Combined Rakes and Tedders.

No. 150,310.  Patented April 28, 1874.

2 Sheets--Sheet 1.

2 Sheets--Sheet 2.

A. J. FARRAND & A. QUICK.
Combined Rakes and Tedders.

No. 150,310. Patented April 28, 1874.

Witnesses.
A. Ruppert
B. Edw. J. Eils

Inventor:
A. J. Farrand
A. Quick
D. P. Holloway & Co.
Att'y

UNITED STATES PATENT OFFICE.

ANDREW J. FARRAND AND ABRAM QUICK, OF RARITAN, NEW JERSEY.

IMPROVEMENT IN COMBINED RAKES AND TEDDERS.

Specification forming part of Letters Patent No. 150,310, dated April 28, 1874; application filed February 25, 1874.

*To all whom it may concern:*

Be it known that we, ANDREW J. FARRAND and ABRAM QUICK, of Raritan, in the county of Somerset and State of New Jersey, have invented a new and useful Combined Hay Rake and Tedder; and we do hereby declare that the following is a full, clear, and exact description of the same, reference being had to the annexed drawing making part of this specification, in which—

Figure 1:
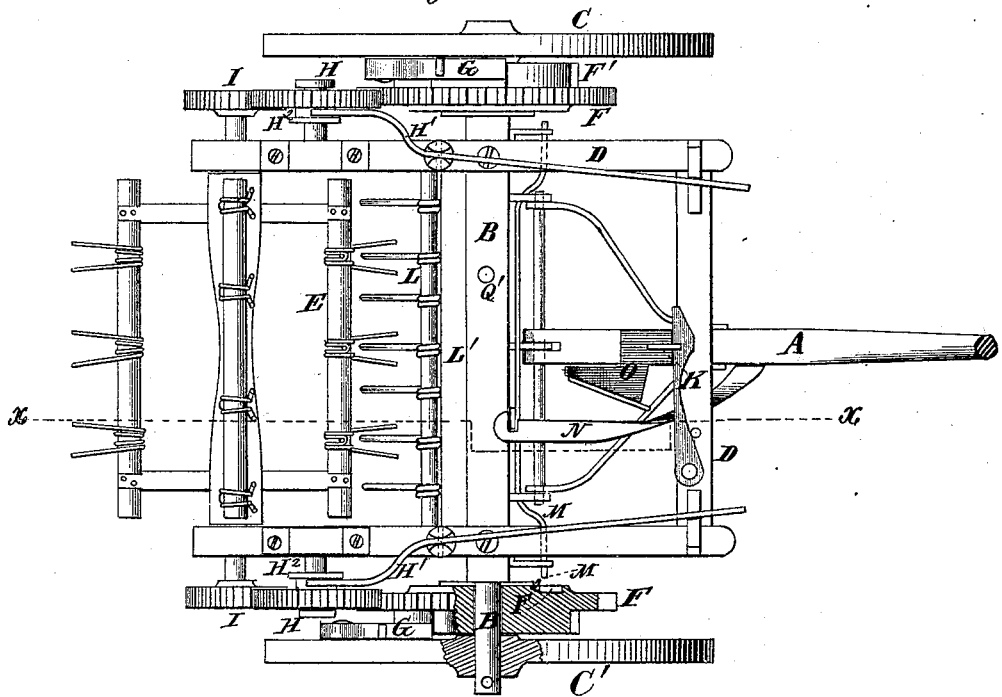
Figure 2:
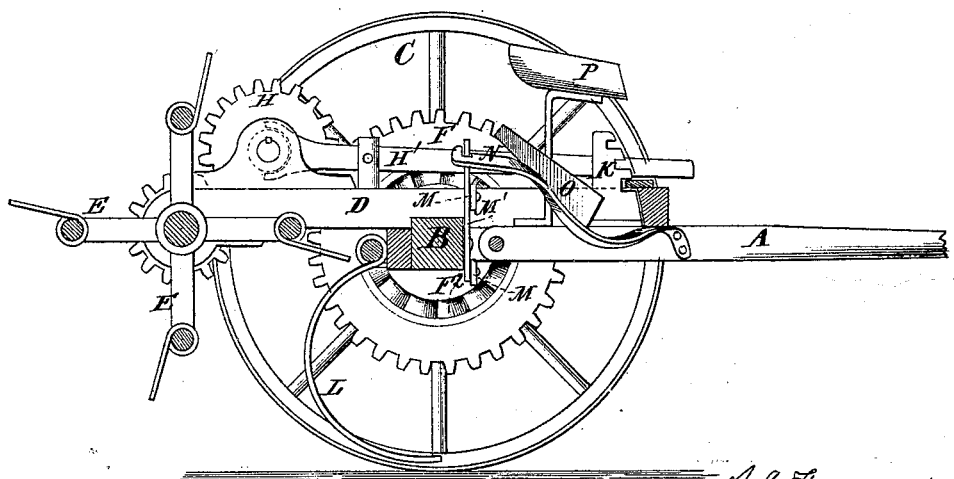
Figure 3:
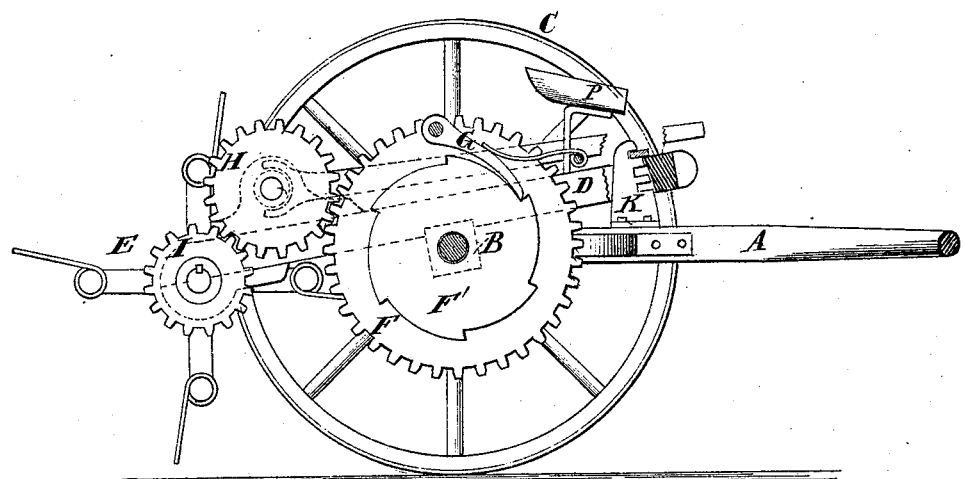
Figure 4:
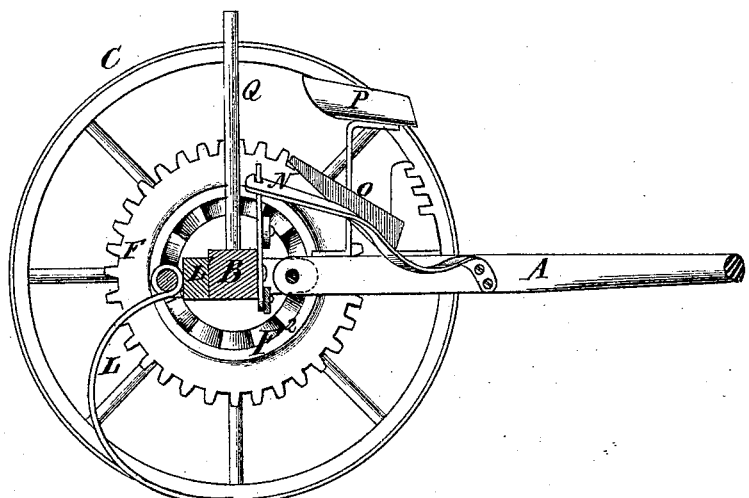
Figure 5:
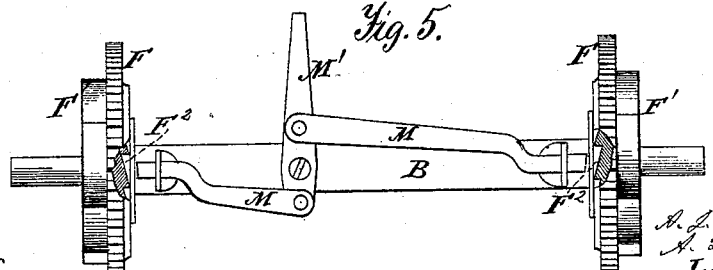

Figure 1 is a plan view. Fig. 2 is a vertical longitudinal section on line $x\ x$, Fig. 1. Fig. 3 is an elevation showing the tedder mechanism as seen when the wheel is removed. Fig. 4 is a sectional elevation, showing the rake without the tedder; and Fig. 5 is an elevation showing the mechanism attached to the axle for raising the rake-teeth.

The same letters are employed in all the figures for the designation of identical parts.

This invention relates to that class of machines in which there is attached to the carriage mechanism for raking hay an independent mechanism for tedding hay, one or the other of which may be used, according to the kind of work required to be done. The improvements consist in modifications in the construction and combination of parts by which the two machines are adapted for alternate use on the same carriage, the details of which will be distinctly set forth in the following description and claims.

The carriage consists of the tongue A, axle B, and wheels C C'. The tongue is hinged to the axle in such manner as to permit the latter to oscillate in the bearings in the hubs of the wheel when the teeth of the rake or tedder require to be raised or lowered. The tedding and raking mechanism are each attached to the carriage, so as to cheapen the cost of construction by making this part of the machine common to both; but as they are to be used separately, either may be detached. D is the tedder-frame, fastened to the axle by bolts, and supporting the tedding-wheel E, which is constructed in the usual manner. It is driven by a train of spur-wheels, consisting of the wheels F, attached to the driving-wheels C C', and revolving with them on the spindle, intermediate idler-wheels H, and the pinions I on the ends of the shaft of the tedding-wheel E. The wheel F is constructed with a hub, $F^1$, having ratchet-teeth on the periphery to engage the pawl G, hinged to the driving-wheel, so that with the forward movement of the latter the wheel F will be revolved, but when the wheels C C' are backed, the pawl slipping on the face of the hub $F^1$, the wheel F will remain stationary. The idler H is thrown in and out of gear by a lever, $H^1$, having its fulcrum on the frame D, sliding on a stud-pin, $H^2$, attached to the frame. The tedding-wheel may be raised or lowered, oscillating with the rocking axle, its height being regulated by a notched bar, K, attached to the tongue, and arranged to engage a spring-latch on the frame.

When the machine is to be used as a rake, the frame D and tedding mechanism attached thereto are removed, and the rake L attached to the beam L', fastened to the axle by bolts, so as to be rigid therewith, but oscillating to raise and drop the teeth with the axle. This latter motion is controlled as follows: Two rods, M M, are attached to a hand-lever, M', having its fulcrum on the axle, as clearly shown in Fig. 5. There are ratchet-formed recesses in the inner faces of the wheels F, as shown in $F^2$, with which the locking-rods M M may be engaged by shifting the levers M'. When thus locked the strain of the draft, acting on the axle, will cause it partially to rotate, thereby raising the teeth and releasing the accumulated hay. These latches are automatically disengaged by the cam-plate O, fastened to the tongue, and so formed and placed that as the lever M' is swung forward, striking against the edge of the plate O, the lever will be shifted and the lock-bars $m$ be disengaged, allowing the rake-teeth to fall by their own gravity. At the same time the lever M', being returned to its vertical position, engages a notch in the spring-catch N, by which it is held until again shifted by hand. The driver rides in a detachable seat, P, which may be attached to the tongue or axle, in such position as to properly balance the machine by the weight of the driver, when used for one purpose or the other. A lever, Q, attached to the axle may be used by the driver to turn the axle, and raise or drop the attached mechanism.

What we claim as new, and desire to secure by Letters Patent, is—

1. In a combined rake and tedder, the combination, with the axle and flexible tongue hinged thereto, of a detachable frame, which, when rigidly secured to the axle, oscillates with it to elevate and depress the tedding-wheel attached to said frame, substantially as set forth.

2. In a combined rake and tedder, the combination, with the axle and flexible tongue hinged thereto, of a detachable rake, which may be rigidly attached to the axle, and adjusted by oscillating with the axle, substantially as set forth.

In testimony whereof we have signed our names to this specification in the presence of two subscribing witnesses.

A. J. FARRAND.
ABRAM QUICK.

Witnesses:
ELIAS VAN FLEET, Jr.,
A. P. COOPER.